United States Patent [19]

Causley et al.

[11] Patent Number: 4,551,734

[45] Date of Patent: Nov. 5, 1985

[54] INK CARTRIDGE WITH INK LEVEL SENSOR

[75] Inventors: Gary C. Causley, Portland; Martin D. Rosback, West Linn, both of Oreg.

[73] Assignee: Tektronix, Inc., Beaverton, Oreg.

[21] Appl. No.: 679,199

[22] Filed: Dec. 6, 1984

[51] Int. Cl.[4] .................... G01D 15/18; B65D 37/00; G01F 23/26; E41F 33/12

[52] U.S. Cl. .................................. 346/140 R; 346/75; 222/212; 73/304 R; 101/364; 400/470

[58] Field of Search ............. 346/75, 140 R; 222/212; 73/304 C, 304 R; 101/364, 366; 400/470

[56] References Cited

U.S. PATENT DOCUMENTS

| | | | |
|---|---|---|---|
| 3,708,798 | 1/1973 | Hildenbrand et al. | 346/140 R |
| 4,196,625 | 4/1980 | Kern | 73/304 R |
| 4,202,267 | 5/1980 | Heinzl et al. | 101/364 |
| 4,422,084 | 12/1983 | Saito | 346/140 R |
| 4,432,005 | 2/1984 | Duffield et al. | 346/140 R |

*Primary Examiner*—E. A. Goldberg
*Assistant Examiner*—Gerald E. Preston
*Attorney, Agent, or Firm*—John D. Winkelman; David P. Peterson

[57] ABSTRACT

An ink cartridge 10 includes an ink level sensor 38 having a probe supporting structure, such as platform 174, which projects into a collapsible ink container 16 from an ink container support 18. First and second electrical probes 40, 41 are embedded within the structure, with tip portions 188, 190 of the probes 40, 41 being exposed to provide an electrically conductive path through the ink between the probes. Flat closure surface 176, 178 are provided between the exposed portions of the probes against which the container 16 collapses. When the ink container 16 collapses against these surfaces 176, 178, the resistance between the probes increases, is insensitive to ink conductivity, and indicates that volume of ink within the cartridge is low. The platform 174 is supported by tapered necks 180, 182 projecting into the ink container from the ink container support 18. The probes 40, 41 extend through these necks 180, 182 and into apertures 184, 186 provided through platform 174, thereby exposing the probe tips 188, 190 to ink within the ink container 16.

11 Claims, 8 Drawing Figures

INK CARTRIDGE WITH INK LEVEL SENSOR

TECHNICAL FIELD

This invention relates to an ink cartridge with a sensor for determining the level of ink within the cartridge. More specifically, the ink cartridge is for an ink jet printer of the type which supplies pressurized fluid to the cartridge for pressurizing ink within the cartridge to enhance the flow of ink from the cartridge to an ink jet printing head.

BACKGROUND OF THE INVENTION

Ink jet printers having one or more ink jet heads for projecting drops of ink onto paper or other printing medium to generate graphic images and text have become increasingly popular. To form color images, multiple ink jet printing heads are used, with each head being supplied with ink of a different color from an associated ink cartridge.

In a common arrangement, the print medium is attached to a rotating drum, with the ink jet heads being mounted on a travelling carriage that traverses the drum axially. As the heads scan spiral paths over the medium, ink from the ink cartridges is delivered to the ink jet heads. Ink drops developed within the heads are projected from a minute orifice to form an image on the medium. A suitable control system synchronizes the generation of ink drops with the rotating drum.

Such printers commonly employ replaceable ink cartridges. One such known cartridge, designated the Maco cartridge, is produced by Matsushita Electronic Components Co., Ltd. of Japan. The Maco cartridge has an internal ink container which includes a collapsible ink bag and an ink bag support. The ink bag and support are clamped together by a mechanical seal. The assembled ink bag, ink bag support and mechanical sealing components are positioned within a plastic housing. An ink flow passageway is provided for delivering ink from the ink container to an ink jet head of the printer. Also, an air flow passageway is provided through which pressurized air is delivered by the printer to the portion of the interior of the housing which is outside of the ink container. This pressurized air applies pressure to the ink bag and urges ink from the ink bag through the ink flow passageway.

In addition, the Maco cartridge includes a pair of spaced apart elongated stainless steel probes which extend from the exterior of a cap portion of the housing, through the ink bag support, and into the interior of the ink bag. The tips of the probes are thus exposed to ink contained within the bag. More specifically, in the Maco cartridge, the probes pass through a wedge-shaped projection extending from the ink bag support into the ink container, the wedge being tapered along its free edge. The tips of the probes extend beyond this free edge and into ink within the bag. In operation, the ink jet printer applies a voltage to the probes. The printer monitors the electrical resistance in a conducting path through the ink between the tips of the probes. As ink is used from the bag, the bag collapses. This changes the resistance in the conductive path between the probes. In theory, with the Maco construction, by monitoring this resistance, the volume of ink in the container is known. In addition, the ink jet printer is designed to automatically shut off when the resistance reaches a predetermined level. This is intended to prevent the ink jet head from being clogged with an air bubble which may form in the ink jet head if the printer continues to operate after the cartridge is empty.

The Maco ink level sensor suffers from a number of disadvantages. In particular, this device produces inconsistent resistance determinations for the same amount of ink within the ink bag. At times when an ink bag is substantially empty, the probe resistance readings may indicate that significant amounts of ink remain in the bag. This subjects the ink jet heads to clogging by air bubbles generated when the ink jet printer is operated with a substantially empty cartridge. In contrast, at other times, when substantial amounts of ink remain in the ink bag, the probe readings may correspond to an empty ink bag. Under these circumstances, changing of the ink cartridge results in wasted ink.

Therefore, a need exists for an ink cartridge which overcomes these and other disadvantages of the prior art.

SUMMARY OF THE INVENTION

An ink cartridge in accordance with the present invention includes an ink container assembly which includes a flexible ink container connected to an ink container support. An ink flow opening through the support communicates with the interior of the ink container. A hollow durable housing receives and encloses the ink container assembly. Ink from the ink container passes through the ink container support and an ink flow port of the housing to the exterior of the housing for delivery to an ink jet head. The housing also includes a fluid flow port which communicates with the interior of the housing, but is exterior to the ink container. When pressurized fluid, suitably air, is fed through the fluid flow port to the interior of the housing, pressure is applied to the exterior of the ink container. This enhances the flow of ink from the ink container and cartridge. The ink cartridge includes an ink level sensing apparatus for accurately determining the volume of ink remaining in the ink cartridge.

More specifically, the ink level sensor includes an electrical probe-supporting structure which extends into the ink container. This supporting structure includes at least one ink container closure surface against which the container collapses as ink is used. First and second spaced apart electrical probes extend from the exterior of the cartridge, through the ink container support, and into the probe supporting structure. A portion of at least one probe is exposed through the closure surface. The ink container collapses against the closure surface to close off the conductive path between the two probes as the ink container is emptied of ink. The change in resistance between the two probes is sensed and utilized to provide an indication of the volume of ink remaining within the ink container.

As a further aspect of the invention, the probe supporting structures comprises a platform with first and second planar container closure surfaces. First and second spaced apart apertures are provided through the platform between such container closure surfaces. A portion of the first probe extends into, and is exposed within, one of the apertures. Also, a portion of the second probe extends into, and is exposed within, the other aperture. This establishes a conductive path through the ink along the first and second container surfaces and between the exposed portions of the probes.

As still another specific feature of the invention, the probe supporting structure includes first and second necks which project from the ink container support and support the platform. A first of the probes extends through one of the necks and into the platform. Also, the second of the probes extends through the other of the necks and into the platform.

As a further feature of the invention, the necks taper from the ink container support toward the platform to guide the collapsing of the ink container.

It is accordingly one object of the present invention to provide an ink cartridge with an improved ink level sensor.

It is another object of the invention to provide an ink level sensor which reliably indicates the volume of ink remaining in an ink cartridge and thereby accurately indicates when the ink cartridge is low of ink and should be replaced, even when the actual conductivity of the inks varies greatly.

These and other objects, features and advantages of the present invention will become apparent wth reference to the following description and drawings.

DETAILED DESCRIPTION OF PREFERRED EMBODIMENT

Figure 1:
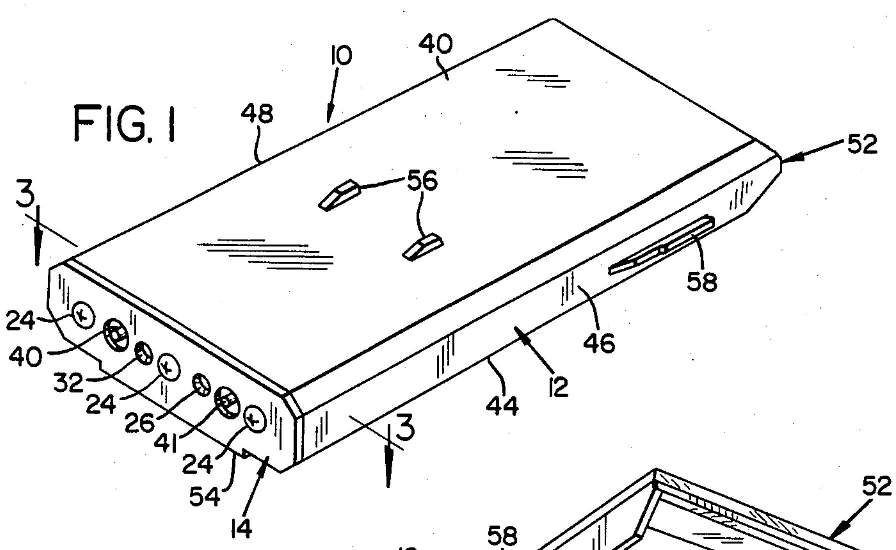
FIG. 1 is an isometric view of an ink cartridge in accordance with the present invention.
Figure 2:
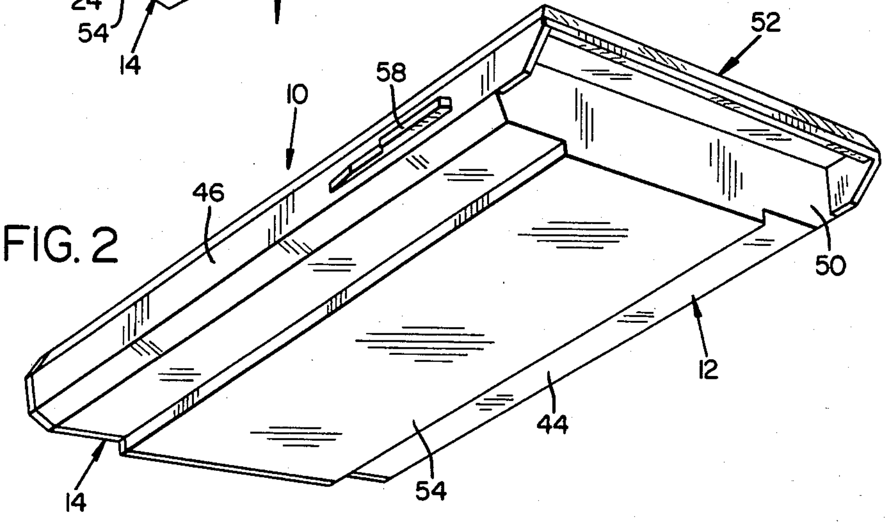
FIG. 2 is an isometric view of the underside of the ink cartridge of FIG. 1.
Figures 6, 7, 8:
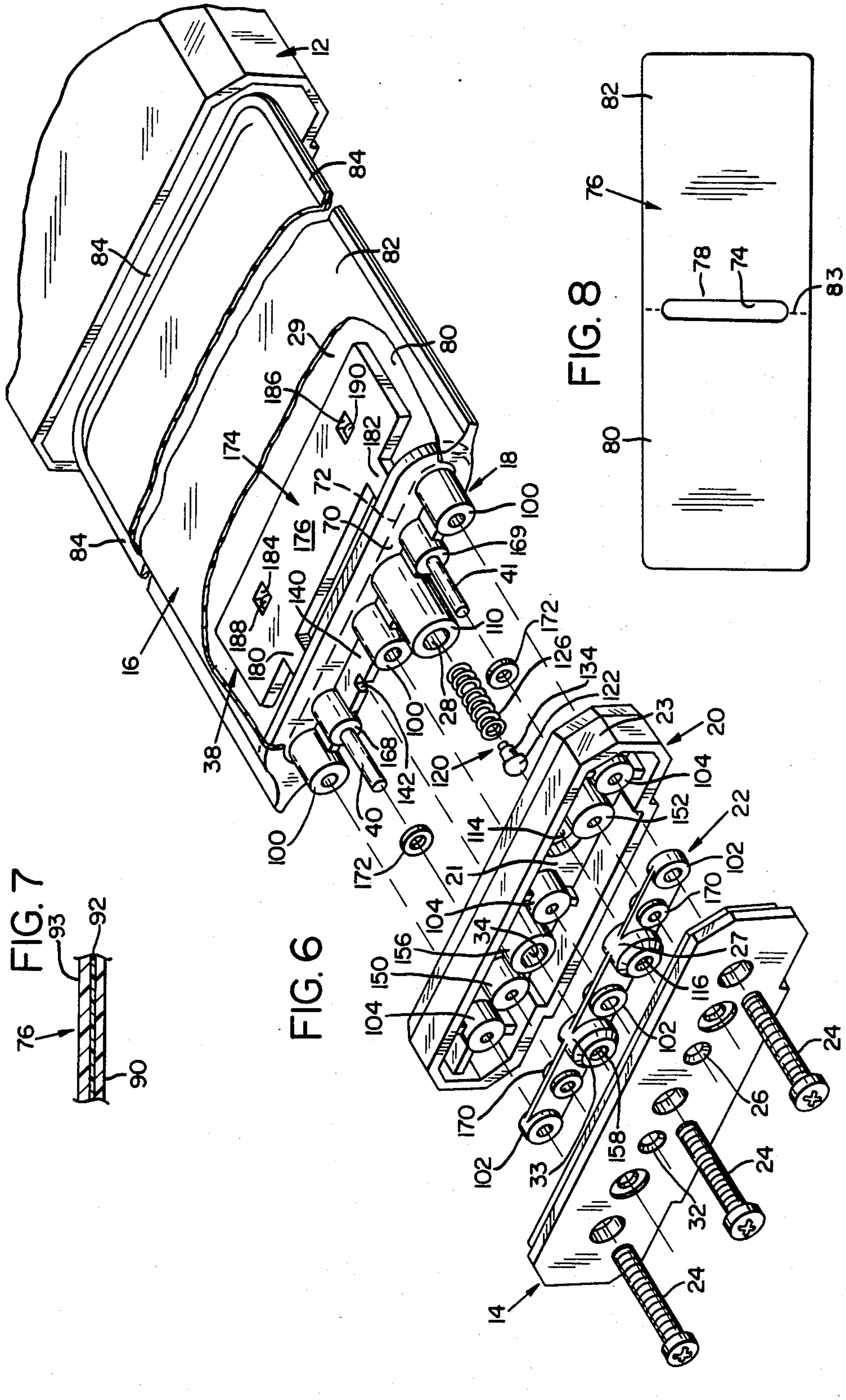
FIG. 6 is a partially broken away exploded view of the ink cartridge of FIG. 1.
FIG. 7 is a sectional view of a portion of the ink container.
FIG. 8 is a plan view of a sheet of ink container forming material during an intermediate ink cartridge manufacturing step.

With reference to FIGS. 1, 2 and 6, an ink cartridge 10 in accordance with the invention comprises an elongated hermetically sealed housing including a rectangular body 12 closed at one end by a cap 14. Housed within the body is an ink container assembly comprised of an ink container 16 of a flexible, collapsible material which is mounted to an ink container support 18. The construction also includes a gasket support or retainer 20 between the ink container support 18 and cap 14. Also, a cap sealing gasket 22 is provided between the cap 14 and gasket support 20 for purposes explained below. Fasteners 24 secure the ink container support 18 to the cap, with the gasket retainer 20 and the gasket 22 in place. The gasket retainer 20 has a base 21 and a peripheral wall 23 which projects from the base 21 and into engagement with the underside of the cap 14 when this assembly is fastened together. This fastened assembly is positioned within the housing body 12 and the cap 14 is secured, as by adhesive, to the body 12 to seal the cartridge.

A path is provided for ink to flow from the interior of the ink container 16 to the exterior of the cartridge, from which the ink is delivered to an ink jet head of an ink jet printer. The cap 14 is provided with an ink flow port 26 which communicates through an O-ring portion 27 of gasket 22, when O-ring 27 is punctured, and through an ink flow passageway 28, described below, with the interior 29 of the ink container 16. In addition, a path is provided for delivering air from the ink jet printer to the cartridge. The air applies pressure to the exterior of the ink container 16 so as to enhance the flow of ink from the cartridge. More specifically, the cap 14 includes an air flow port 32 which communicates through an O-ring portion 33 of gasket 22, when O-ring 33 is punctured, and through a pressurized air flow passageway 34, described below, with a portion 35 of the housing body 12 which is within the housing body and outside of the ink container 16. Typical operating pressures are approximately one pound per square inch. Because the housing is hermetically sealed, pressurized air is not lost from the housing. Also, ink does not leak from the housing in the unlikely event that the ink container 16 ruptures.

The cartridge also includes an ink level sensor, designated generally at 38, for determining the level of ink within the cartridge. Although described in detail below, the ink level sensor includes a pair of electrical probes 40, 41 extending from the interior of the ink container 16 to the exterior of the cartridge housing. These probes are of an electrically conductive material which resists corrosion by the ink, such as stainless steel. The ink jet printer applies an alternating current voltage across the probes at a location outside of the housing. In addition, the resistance in a conducting path through the ink between the probes is monitored. This resistance varies as ink is used from the ink container and the ink container collapses. The magnitude of the resistance provides an indication of the amount of ink within the ink cartridge. In particular, from this resistance, a determination is made of when the ink cartridge is low of ink and should be changed.

The housing body 12 is formed of a lightweight, durable, rigid, impact-resistant material. A polycarbonate material designated Lexan 141R-5107 and produced by General Electric Company. Because the cap 14 is exposed to ink passing through the ink flow port 27, it is desirable that this cap be formed of a material which resists corrosion when exposed to the ink. Polysulfone is one such suitable material.

Referring to FIGS. 1 and 2, the body 12 is preferably molded and comprised of top and bottom plates 40, 44, first and second side plates 46, 48 and an end plate 50. A handle 52 is formed by portions of the top plate 44 and side plates 46, 48 which extend beyond the end plate 50. Thus, handle 52 extends transversely between the two side plates and provides a convenient grip for use when removing and replacing the cartridge. The plate 44 includes a raised central portion 54, while keys 56 project upwardly from the plate 40. These keys and raised portion fit within a corresponding cartridge receiving socket of the ink jet printer and prevent inadvertant reversed installation of the cartridge. Guides 58 project from the sides 46, 48 of the housing 12 and fit within slots in the cartridge socket to support and properly align the ink cartridge when installed.

Figure 3:
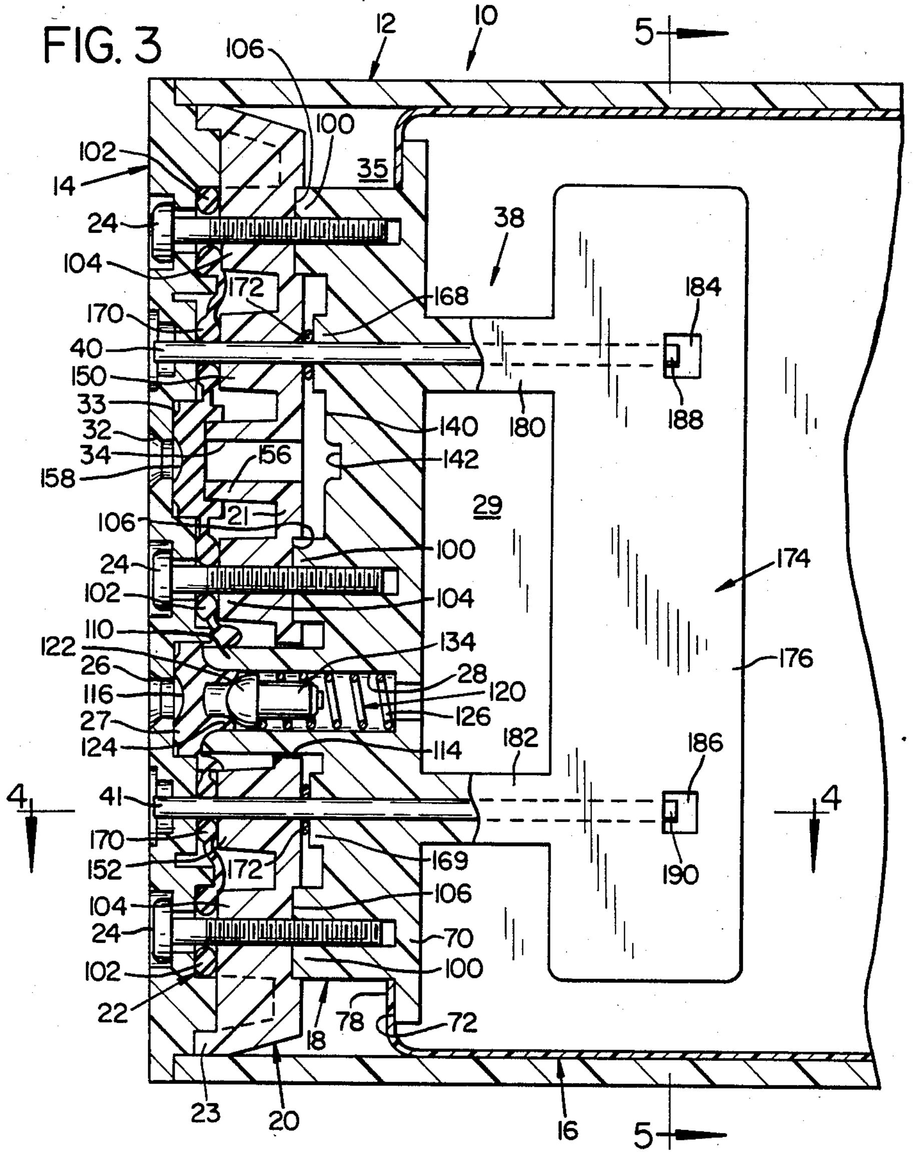
FIG. 3 is a sectional view of the ink cartridge of FIG. 1, taken along lines 3—3 of FIG. 1.
Figure 4:
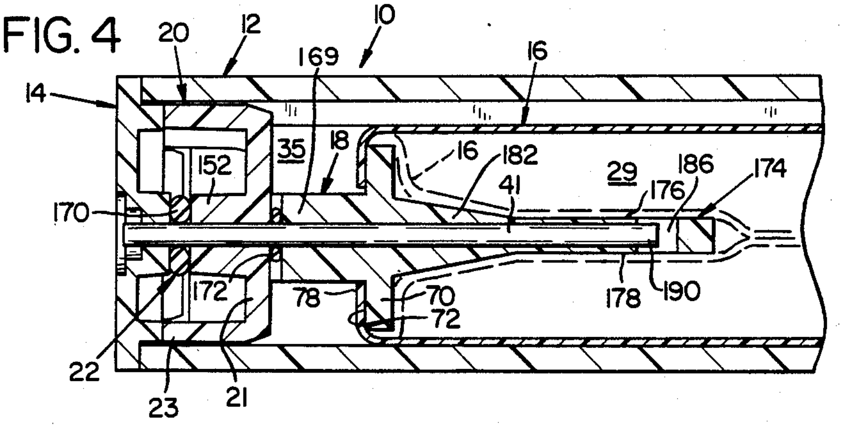
FIG. 4 is a sectional view of the ink cartridge of FIG. 1, taken along lines 4—4 of FIG. 3.

The ink container assembly is best understood with reference to FIGS. 3, 4 and 6. The ink container support 18 includes a support plate 70 with a flat planar ink container mounting surface 72 to which the ink container 16 is directly mounted and sealed. Although adhesive seals are suitable, in the preferred embodiment, this sealing is accomplished by thermally fusing the ink container to the mounting surface.

More specifically, in accordance with a preferred method of manufacturing the ink container assembly, a central opening 74 (FIG. 8) is provided in a rectangular sheet 76 of ink container forming material. The ink container support 18 is inserted upwardly through this opening 74 to position the marginal edge portions 78 of the sheet which bound the opening 74 against the mounting surface 72, as shown in FIG. 6. These edge portions are then thermally fused to the mounting surface. Thereafter, the ink container side forming portions 80, 82 of the sheet 76 are folded about the longitudinal axis of the ink container support plate 70, that is, along fold line 83 in FIG. 8, until positioned as shown in FIG. 6. The sides 80, 82 are then sealed together along edges 84, as by heat sealing, to complete the ink container assembly.

In the preferred embodiment, the ink container support 18 is formed of a material which resists corrosion by the ink, with polyethylene being one suitable material. Furthermore, the ink container 16, see FIG. 7, is formed of a sheet 76 of multi-layered construction. The inner most layer 90 is comprised of a material which is compatible with the ink. That is, it resists corrosion by the ink. Also, this material is suitable for heat sealing. This first layer may comprise a low density polyethylene. The central layer 92 of sheet 76 provides a vapor barrier which minimizes the passage of gas into the ink container 16. Gas in the ink may form minute bubbles which clog the ink jet head of the printer. One suitable vapor barrier is a sandwich of a layer of polyvinylacetate between two layers of polyvinylidene chloride. This latter material is commonly designated by the trademark SARAN. Finally, the outer layer 93 is an ink container reinforcing material, which adds strength and some stiffness to the ink container. One suitable example is sixty guage biaxial nylon. A multi-layered material which fits this description is presently being sold by Champion International Corporation of San Leandro, Calif. for applications such as containing wine within cardboard cartons.

The stiffness of the outer layer facilitates the collapsing of the bag in a predictable manner. This factor improves the performance of the ink level sensor 38, as explained below. Moreover, with this construction, and due to the relatively greater stiffness of applicants container when compared to the known prior art, applicant is able to easily remove all gas from the ink container prior to filling the container with ink. This is accomplished by applying a vacuum to the ink flow port 32, which fully collapses the ink container and removes gas from the container.

With reference again to FIGS. 2, 4 and 6, plural fastener receiving bosses 100 project in a first direction toward cap 14 from the surface of the ink container support plate 70. Each of the fasteners 24 pass through an opening in the cap, an O-ring portion 102 of the gasket 22, a projection or boss 104 extending in the first direction from the base 21 of the gasket retainer 20, and is threaded into the fastener receiving bosses 100. As shown in FIG. 2, the ink container support 18 interfits the gasket retainer 20 so as to strengthen the construction. More specifically, the bosses 100 mate within corresponding recesses 106 which are provided in the gasket retainer base 21. Thus, when the cartridge is assembled, the ink container support is held securely in place.

An annular ink flow passageway defining projection 110 also extends in the first direction toward cap 14 from the plate 70. The ink flow passageway 28 extends through projection 110. When the cartridge is assembled, ink flow projection 110 passes through an opening 114 through the base 21 of the gasket retainer 20. This projection 110 abuts the interior surface of the gasket O-ring portion 27. The opposite surface of the O-ring portion 27 surrounds and seals the ink flow port 26. The center 116 of the O-ring portion 27 is initially sealed as indicated in FIG. 3. When this seal is punctured, ink is permitted to flow from the ink container 16, through the ink flow passageway 28, through the gasket portion 27 and out of the ink flow port 26. A check valve assembly 120 is provided within the passageway 78. The assembly 120 includes a valve having a hemispherical head 122. The head 122 is urged against a valve seat 124 of the O-ring portion 27 by a coil spring 126 positioned within the ink flow passageway. The valve has a stem 134 which extends loosely within the center of the coil spring so that the valve is retained in place without the need for adhesive. The valve and spring are preferably of an ink corrosion resistant material, such as respectively of polyethylene and stainless steel.

A reinforcing rib 140 extends between the various projections of the ink container support. This rib has a notch 142 which is positioned in alignment with the pressure fluid port 32 when the cartridge is assembled. The notch 42 provides an enlarged unobstructed opening and clearance for insertion of an air supply needle into the interior 35 of the housing 12.

Various gasket retaining projections extend in the first direction toward the cap 14 from the base 21 of the gasket retainer 20. As previously mentioned, these gasket retaining projections include the bosses 104. In addition, these projections include annular projections 150, 152 through which the respective probes 40, 41 are inserted when the cartridge is assembled. In addition, an annular pressure air flow projection 156 extends in this first direction from the base 21 of the gasket retainer 20. The air flow passageway 34 passes through the projection 156. The air flow projection extends into engagement with the interior surface of the O-ring portion 33 of the gasket 22. The other surface of O-ring portion 33 is positioned against the cap 14 and surrounds and seals the air flow port 32. The center 158 of O-ring portion 33 is initially sealed to block the flow of air through port 32 until the gasket is punctured. As can be seen from FIG. 3, upon puncturing the O-ring portion 33 at 158, pressurized air may be delivered through the flow port 32, through the gasket O-ring portion 33, through the passageway 34, and past the notch 142 and into the interior 35 of the housing 12. Reinforcing ribs provide added support to the various projections from the gasket retainer. Thus, when assembled, the gasket 22 is held by the projections of the gasket retainer 20 against the cap 14. Appropriate recesses, unnumbered, are provided in the interior surface of the cap 14 for receiving the gasket 22.

The probes 40, 41 are preferably molded into the ink container support 18 during the manufacture of this support. Projections 168, 169 extend toward the cap 14 from the ink container plate 70 and surround and reinforce the respective probes 40, 41 at the location where the probes emerge from the plate 70. Probe 40 extends from the projection 168, through projection 150 of the gasket retainer 20, through an O-ring portion 170 of the gasket 22 and through an opening in cap 14 to the exterior of the cartridge. Similarly, probe 41 extends from projection 169, through projection 152 of the gasket retainer 20, through a corresponding O-ring portion 170 of the gasket 22 and through another opening in cap 14 to the exterior of the cartridge. Also, O-rings 172 surround and seal the probes 40, 41 at a location between projections 168, 169 and the base 21 of the gasket retainer 20. Thus, the probes 40, 41 are supported securely and are easily accessible for application of a voltage across the ends of the probes which are exposed to the exterior of the cartridge.

The gaskets 22 and 172 are typically of an ink corrosion resistant material of suitable resiliency, such as rubber. Ethylenepropylene of 50 durometer on the Shore A scale is one suitable gasket material. Also, the gasket support 20 may be of the same material as housing 12.

With this construction, the ink cartridge 10 is extremely resistant to ink leakage arising from impact to the cartridge, environmental temperature fluctuations, and above normal pressure within the ink cartridge. Moreover, the ink cartridge is easy to manufacture, install and use.

The ink level sensor 38 and its operation will be described with reference to FIGS. 3, 4 and 5. The ink level sensor 38 includes a probe supporting structure 174 projecting from the ink container support plate 70 into the interior of the ink container 16. A portion of the probes, in this case the probe tips 188, 190 are exposed by the supporting structure to ink within the interior of the ink container 16. The ink being conductive, upon application of a voltage across the probes, the resistance of conductive path through the ink and between the two probes may be monitored by the ink jet printer. As ink is used, the ink container 16 collapses as shown in dashed lines in FIGS. 4 and 5. Eventually, the path between the two probes through the ink is completely blocked by the collapsed ink container 16. When this occurs, the monitored resistance jumps to a high level. This change in resistance provides an indication that the ink cartridge 16 is low of ink and should be replaced.

More specifically, the probe supporting structure 174 may comprise a platform 174 supported by necks 180, 182 which project from the ink container support plate 70. The probes 40, 41 extend through the respective necks and into the interior of the platform 174. As can be seen in FIG. 4, these necks are tapered moving away from the ink container support plate 70. This tapering guides the container 16 as it collapses to facilitate the container in a controlled uniform manner.

Apertures 184, 186 are provided through the platform 174 with the tips 188, 190 of the probes extending into these apertures. Thus, the exposed portions of the probes are completely surrounded by the platform 174. As the ink is used, the ink container 16 collapses against upper and lower flat planar ink container closure surfaces 176, 178 of platform 174. This closes off the conductive path between the two probes. Furthermore, this ink container collapses against surfaces 176, 178 when consistently the same amount of ink remains in the ink cartridge.

Figure 5:
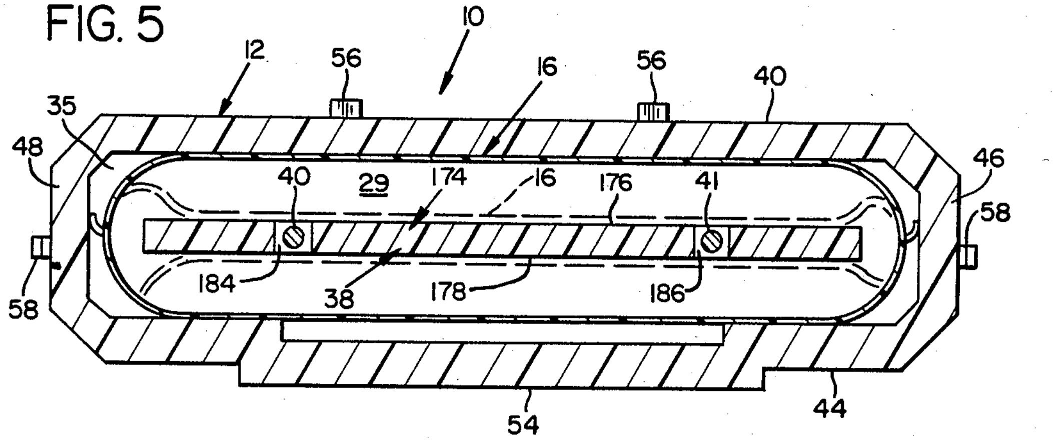
FIG. 5 is a cross sectional view of a portion of the ink cartridge of FIG. 1, taken along lines 5—5 of FIG. 3.

Moreover, as can be seen in FIG. 5, the probes are sized so as not to project into the planes of the upper and lower surfaces 176, 178 of the platform. Therefore, the probes themselves do not interfere with the closing of the ink container against the closure surfaces. Thus, a flat closure surface is provided between the exposed regions of the probe. Only one such flat surface would be provided in the event the probes are only exposed to ink through one surface of the probe supporting structure.

Therefore, by monitoring the resistance, a precise determination can be made of the amount of ink in the cartridge. Furthermore, the cartridges may be changed before they run dry of ink, which could cause a bubble to form in the ink jet head and clog the head. For example, for a 200 milliliter volume cartridge, it is desirable to change the cartridge when no less than 20 milliliters of ink remain. Also, changing of the cartridges is not performed too soon, which would waste significant amounts of ink in the cartridge. The ink jet printer is provided with a shut off circuit which automatically stops the printer when a cartridge is low of ink, as indicated by the resistance measured across the probes. After the cartridge is replaced, the printer is then restarted.

Having illustrated and described the principles of our invention with respect to one preferred embodiment, it should be apparent to those persons skilled in the art that such invention may be modified in arrangement and detail without departing from such principles. We claim as our invention all such modifications as come within the true spirit and scope of the following claims.

We claim:

1. An ink cartridge comprising:

an ink container having an ink flow opening through which ink is delivered from the ink container, the ink container collapsing as ink is used from the container;

electrical probe support means projecting into the interior of the ink container, said electrical probe support means including a first flat ink container closure surface against which the ink container collapses as ink is used from the container;

first and second spaced apart electrical probes extending into the ink container, a portion of each of the probes being exposed to the ink within the ink container with the flat ink container closure surface extending between the exposed probe portions, thereby providing a first electrically conductive path between the exposed probe portions and through the ink along the first ink container closure surface, the conductive path being closed as ink is used from the ink container and the ink container collapses against the first container closure surface.

2. An ink cartridge according to claim 1 in which the portions of first and second electrical probes within the ink container are completely embedded within the probe support means except for the exposed probe portions, such exposed probe portions being recessed into the probe support means and being exposed through the first ink container closure surface.

3. An ink cartridge according to claim 1 in which said probe support means includes a platform having first and second planar surfaces, first and second apertures being provided through the platform between such planar surfaces, the first and second probes extending within the platform and respectively into the first and second apertures, the exposed probe portions being exposed to ink through the apertures, the first ink container closure surface comprising the first planar surface, the second planar surface comprising a second ink container closure surface against which the ink container collapses as ink is used from the ink container to close off a second electrically conductive path between the exposed probe portions and through the ink along the second ink container closure surface.

4. An ink cartridge according to claim 3 in which the tips of the respective probes extend into and are exposed within the respective apertures.

5. An ink cartridge according to claim 3 in which the exposed portions of the probes are recessed below the plane of the first and second planar surfaces.

6. An ink cartridge according to claim 3 including ink container support means to which the ink container is mounted, the electrical probe support means including first and second spaced apart necks projecting into the ink container from the ink container support means, the platform being connected to and supported by the necks, the first electrical probe extending through the first neck and into the platform, and the second probe extending through the second neck and into the platform.

7. An ink cartridge according to claim 6 in which the first and second necks are tapered from the ink container support means to the platform.

8. An ink cartridge for an ink jet printer of the type which supplies pressurized fluid to the cartridge for pressurizing ink within the cartridge to enhance the flow of ink from the cartridge, the cartridge having a collapsible ink container from which ink is delivered to the ink jet printer, the pressurized fluid applying pressure against the collapsible ink container, first and second electrical probes having sections which extend into the ink container, the ink jet printer applying an electrical voltage across the probes and monitoring the resistance of an electrically conductive path through the ink between the probes, the cartridge comprising:

ink container support means to which the ink container is mounted;

probe support means extending within the ink container from the ink container support means, said probe support means comprising means for supporting the first and second electrical probes within the ink container, the probe support means surrounding the first probe except at a first location within the perimeter of the probe supporting structure, the first probe being exposed at the first location to ink within the ink container, the portion of the probe support means surrounding the first probe including an ink container closure surface means against which the ink container collapses as ink is used from the ink cartridge for closing off the exposure of the first probe to ink with the ink container when the ink container collapses against the ink container closure surface means, a portion of the second probe also being exposed to ink so as to provide an electrically conductive path through the ink between the first and second probes at times when the ink container is not collapsed against the ink container closure surface means, the resistance in the electrically conductive path changing as the ink container collapses against the ink container closure surface means.

9. An ink cartridge according to claim 8 in which said probe support means includes a platform having first and second planar surfaces, first and second apertures being provided through the platform between such planar surfaces, the first and second probes extending within the platform and respectively into the first and second apertures, the exposed probe portions being exposed to ink through the apertures, the first ink container closure surface comprising the first planar surface, the second planar surface comprising a second ink container closure surface against which the ink container collapses as ink is used from the ink container to close off a second electrically conductive path between the exposed probe portions and through the ink along the second ink container closure surface.

10. An ink cartridge according to claim 8 including ink container support means to which the ink container is mounted, the electrical probe support means including first and second spaced apart necks projecting into the ink container from the ink container support means, the probe support means including a platform connected to and supported by the necks, the first electrical probe extending through the first neck and into the platform, and the second probe extending through the second neck and into the platform.

11. An ink cartridge according to claim 8 in which the first and second necks are tapered from the ink container support means to the platform.

* * * * *